United States Patent
Keip et al.

[19]

[11] Patent Number: 6,050,761
[45] Date of Patent: Apr. 18, 2000

[54] SHIPPING CONTAINER SYSTEM FOR STABILIZING FLEXIBLE LOADS

[76] Inventors: Charles P. Keip, 1052 Byron Rd., Byron Center, Mich. 49315; Scott A. Seth, 2226 Melvin SW., Wyoming, Mich. 49509

[21] Appl. No.: 08/998,195

[22] Filed: Dec. 24, 1997

[51] Int. Cl.⁷ ................................................. B60P 7/12
[52] U.S. Cl. ........................... 410/35; 410/34; 410/41; 410/97; 410/99; 410/154
[58] Field of Search ........................... 410/34, 40, 32, 410/35, 36, 41, 97, 99, 154, 155; 220/1.5, 4.01, 9.1; 206/597, 443, 453, 586; 53/139.7

[56] References Cited

U.S. PATENT DOCUMENTS

| | | | |
|---|---|---|---|
| 1,793,059 | 2/1931 | Chambers | 410/36 |
| 1,876,758 | 9/1932 | Romine | 410/40 |
| 2,283,930 | 5/1942 | Hedges | 410/34 |
| 2,284,616 | 5/1942 | Hedges | 410/40 |
| 3,220,583 | 11/1965 | Robertson . | |
| 3,616,899 | 11/1971 | Blackman | 206/597 |
| 4,247,237 | 1/1981 | Brown | 410/154 |
| 4,314,783 | 2/1982 | Parnell et al. | 410/34 |
| 4,444,311 | 4/1984 | Rias | 206/443 X |
| 5,307,928 | 5/1994 | Bishop | 206/586 X |
| 5,848,865 | 12/1998 | Beals | 410/99 |
| 5,860,627 | 1/1999 | Edwards | 206/443 X |
| 5,899,046 | 5/1999 | Hughes | 206/586 X |

FOREIGN PATENT DOCUMENTS

| | | | |
|---|---|---|---|
| 132587 | 2/1985 | European Pat. Off. | 206/443 |

*Primary Examiner*—Stephen T. Gordon
*Attorney, Agent, or Firm*—Harpman & Harpman

[57] ABSTRACT

A shipping container assembly for securing and stabilizing a load for truck transportation using recyclable components. The container assembly includes multiple support structures positioned about the load with oppositely disposed end cap assemblies to stabilize and protect the load which is comprises of multiple elongated units.

10 Claims, 8 Drawing Sheets

SHIPPING CONTAINER SYSTEM FOR STABILIZING FLEXIBLE LOADS

BACKGROUND OF THE INVENTION

1. Technical Field

This container assembly relates to shipping of multiple units of elongated packaged material that has little torsional rigidity and is therefore difficult to secure on a flat bed truck or the like without using heavy structural encasement systems of wood and metal banding.

2. Description of Prior Art

Prior art container shipping systems have relied on a variety of crating material such as wood to form rigid bundles of the load. Such systems generate large quantities of waste material that requires costly processing and disposal of including metal components such as strapping, lumber and associated hardware such as nails and the like. Other shipping container systems have been developed for special products, see for example U.S. Pat. Nos. 4,314,783, 2,284,616, 2,283,930 and 1,876,758.

In U.S. Pat. No. 4,314,783 a quick release load securing device can be seen in which high tension banding is used to secure a load on a railroad car. A release device holds the banding in tension about the load. The release element on the device can be quickly released by engagement with a hammer.

U.S. Pat. No. 2,284,161 is directed to a means and method of assembling metallic articles for shipment. The method employs metal banding that is wrapped about and between the bundles of rod-like materials forming multiple groups that are held in place more easily on the truck.

U.S. Pat. No. 2,283,930 discloses a shipping and assembly system for metallic articles that use multiple spacers between stacked sheets that are then banded together by interweaving bands that extend around each stack and interconnect same together.

U.S. Pat. No. 1,876,758 is directed to a shipping method and apparatus that forms stacks of packs separated by wood strips and sheets that are then bound together by upright bracing elements and wires.

SUMMARY OF THE INVENTION

A container shipping system for securing multiple elongated packages of synthetic siding material into transportable bundles adapted to over the road shipping by truck. The container shipping system utilizes interconnecting retaining brackets positioned about groups of packages. The brackets are formed from recyclable process cellulose material in pre-formed structural shapes.

DESCRIPTION OF THE PREFERRED EMBODIMENT

Figure 1:
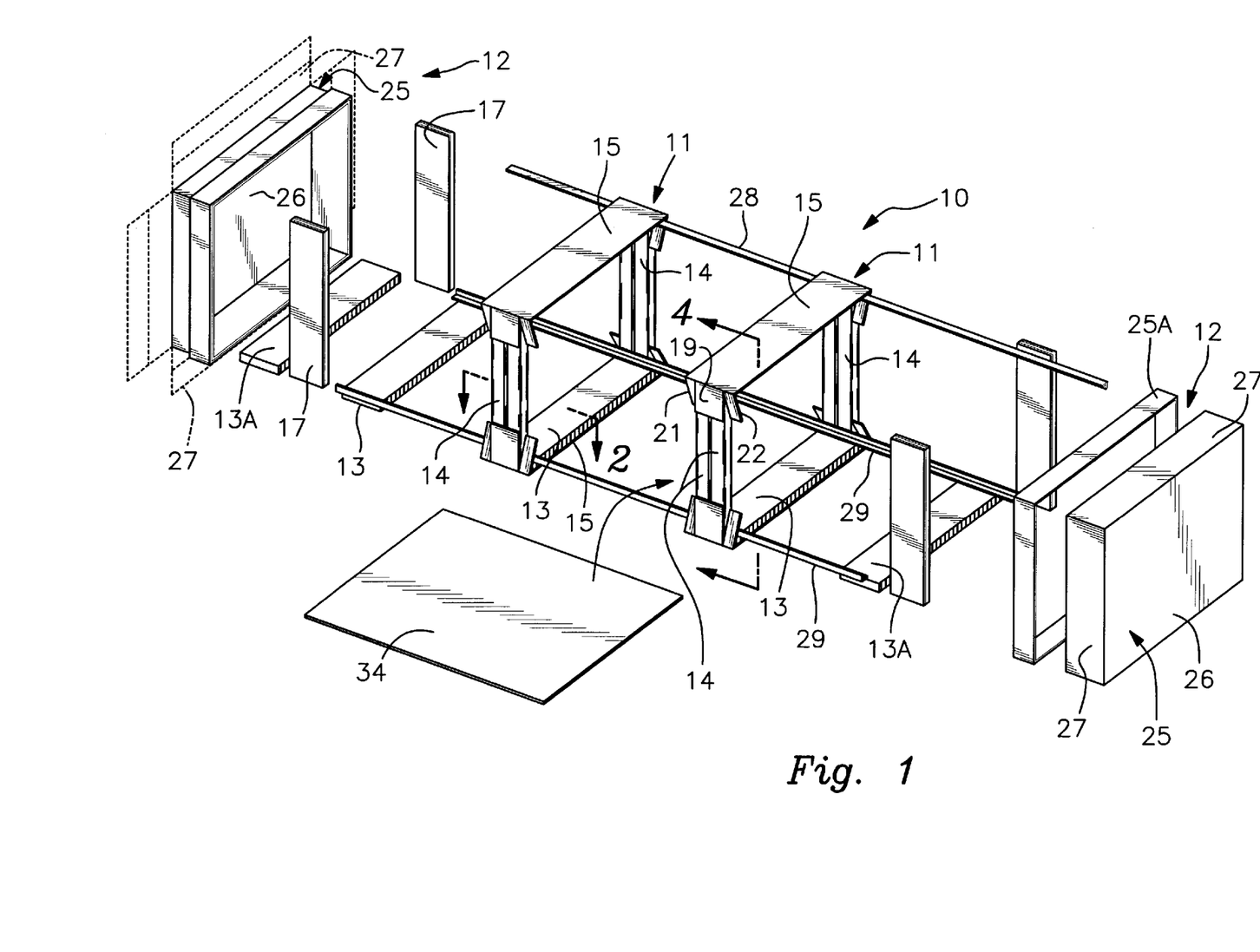
FIG. 1 is an expanded isometric view of the shipping container assembly of the invention.
Figure 2:
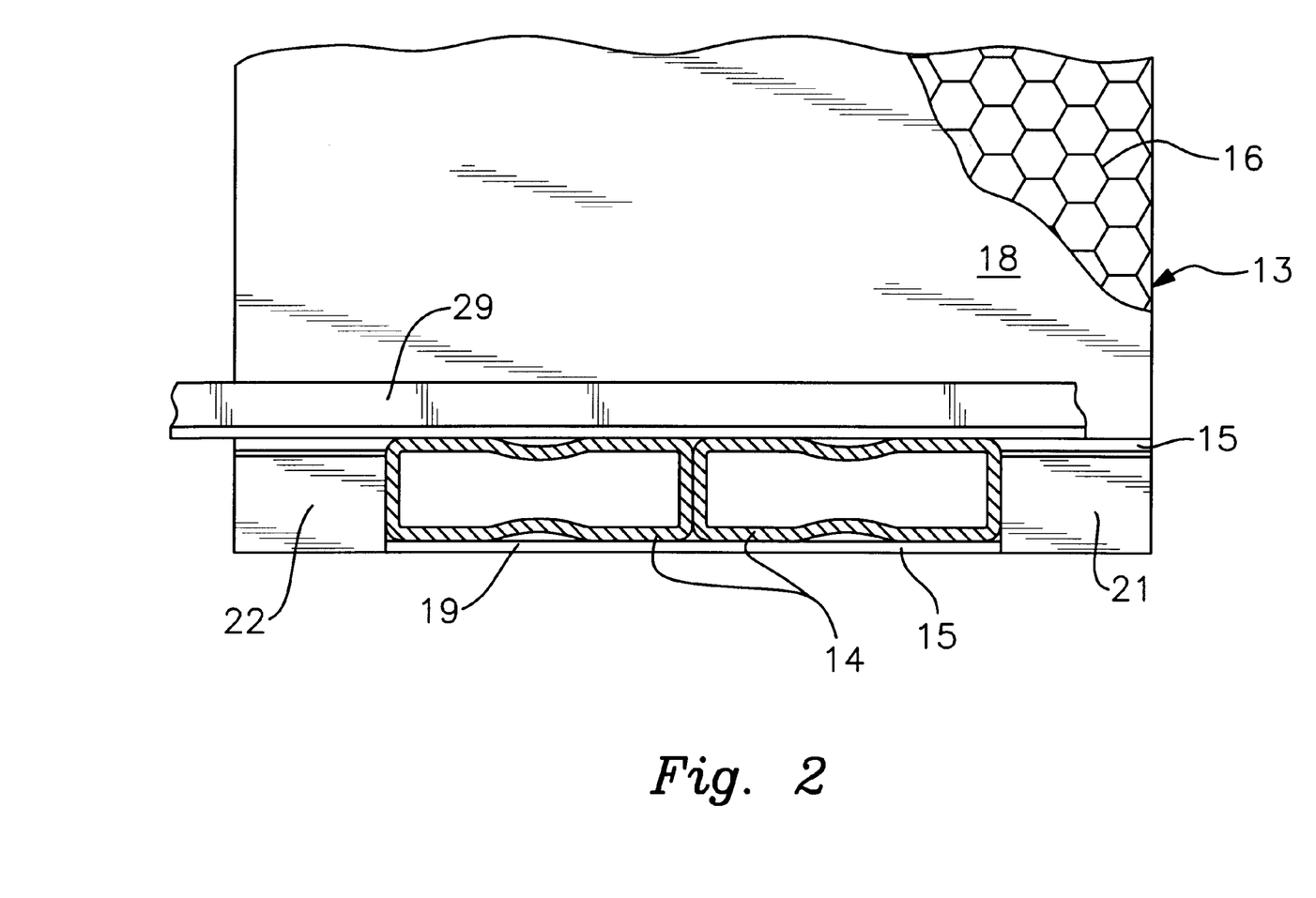
FIG. 2 is an elongated cross-sectional view on lines 2—2 of FIG. 1.
Figure 3:
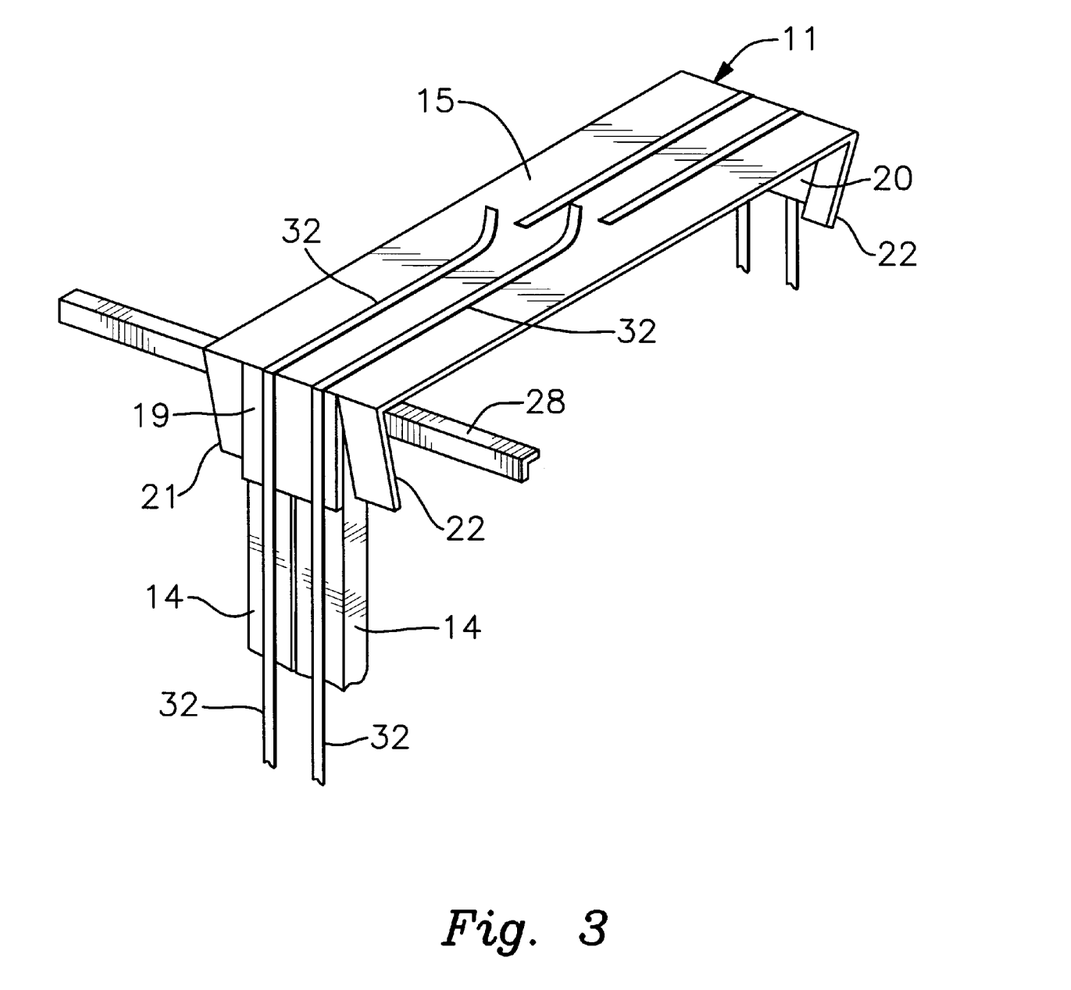
FIG. 3 is an enlarged isometric view of a portion of the shipping container assembly of the invention with portions broken away.

Referring to FIG. 1 of the drawings, a shipping container assembly 10 of the invention can be seen having a pair of intermediate support structures 11 and oppositely disposed end cap assemblies 12. The intermediate support structures 11 are identical, each formed from a honeycomb cellulose base pad 13, best seen in FIGS. 1 and 2 of the drawings and multiple pairs of upstanding support tubes 14 with overlying connecting elements 15. The honeycomb base pads 13 have a honeycomb center of interconnected cellulose bands 16 on edge between upper and lower encasement paper skins 18 as will be well understood by those skilled in the art. As such, the base pads 13 provide a raised insulated surface for a load L illustrated in FIG. 7 of the drawings. The upstanding support tubes 14 are of the "sonoco" post type in which layers of cellulose paper are wrapped around a mandrel, not shown, and glued and then removed providing a free standing rigid tubular assembly as illustrated in FIGS. 2 and 3 of the drawings.

The overlying connecting elements 15 are made from a multiple layer of cardboard sheets of longitudinal flute construction having oppositely disposed right angular flaps 19 and 20 each of which is cut inwardly from its respective free ends to define bendable tabs 21 and 22 on each of said flaps.

Referring now to FIGS. 2–5 of the drawings, it will be seen that to assemble each of the intermediate support structures 11 first a connector element 15 is positioned flange side up on a flat surface. Next the panel base 13 is positioned thereon and pairs of the supporting tubes 14 extend in oppositely disposed relationship between respective free ends of the panel base 13 and upstanding flanges 19 and 20. A second connecting element 15 extends over the upstanding free ends of the support tubes 14 interconnecting same about the load L. The bendable tabs 21 and 22 on each of the flaps 19 and 20 are bent inwardly on each side of the respective support tube pairs 14 stabilizing same therewith.

Figure 9:
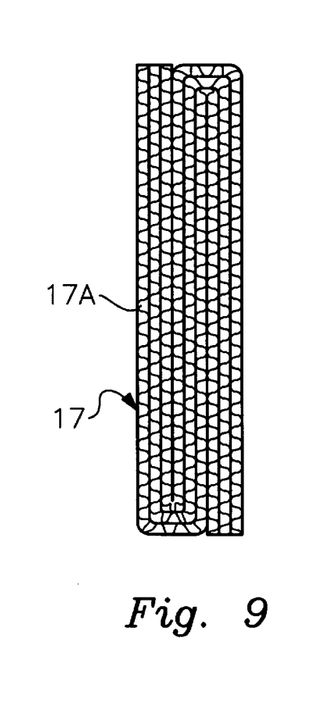
FIG. 9 is an enlarged side elevational view of a portion of a support element.
Figure 10:
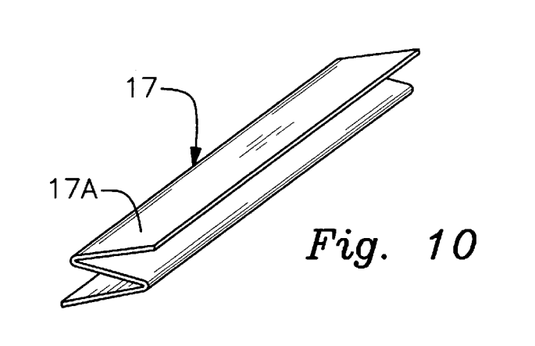
FIG. 10 is a perspective view of a portion of the support element shown in FIG. 9.
Figure 11:
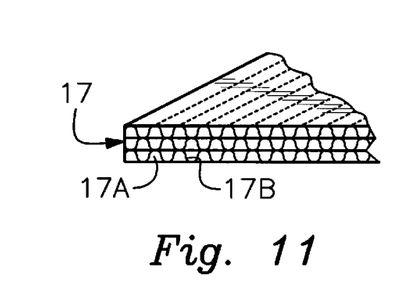
FIG. 11 is an enlarged partial perspective view of support element comparison.

Referring now to FIGS. 1, 5, 6 and 8 of the drawings, the load end cap assemblies 12 are illustrated. A panel base 13A of the hereinbefore described honeycomb construction with a pair of oppositely disposed upstanding support panels 17 that act as spacers are formed from fan folding sheets of triple layered cardboard 17A with longitudinal flutes 17B together as best seen in FIGS. 9, 10 and 11 of the drawings. The end cap assemblies 12 have pre-formed two-part construction with a closure 25 defining a top 26 and foldable integral sidewalls 27 extending therefrom which are of a dimensional configuration to fit over and enclose the hereinbefore described assembled panel bases 13A, and support panels 17 illustrated in FIGS. 1 and 5 of the drawings and assembled in FIGS. 6–8 of the drawings. A retaining sleeve 25A is positioned over the sidewalls 27 when they are positioned on the respective ends of the load L.

Figure 4:
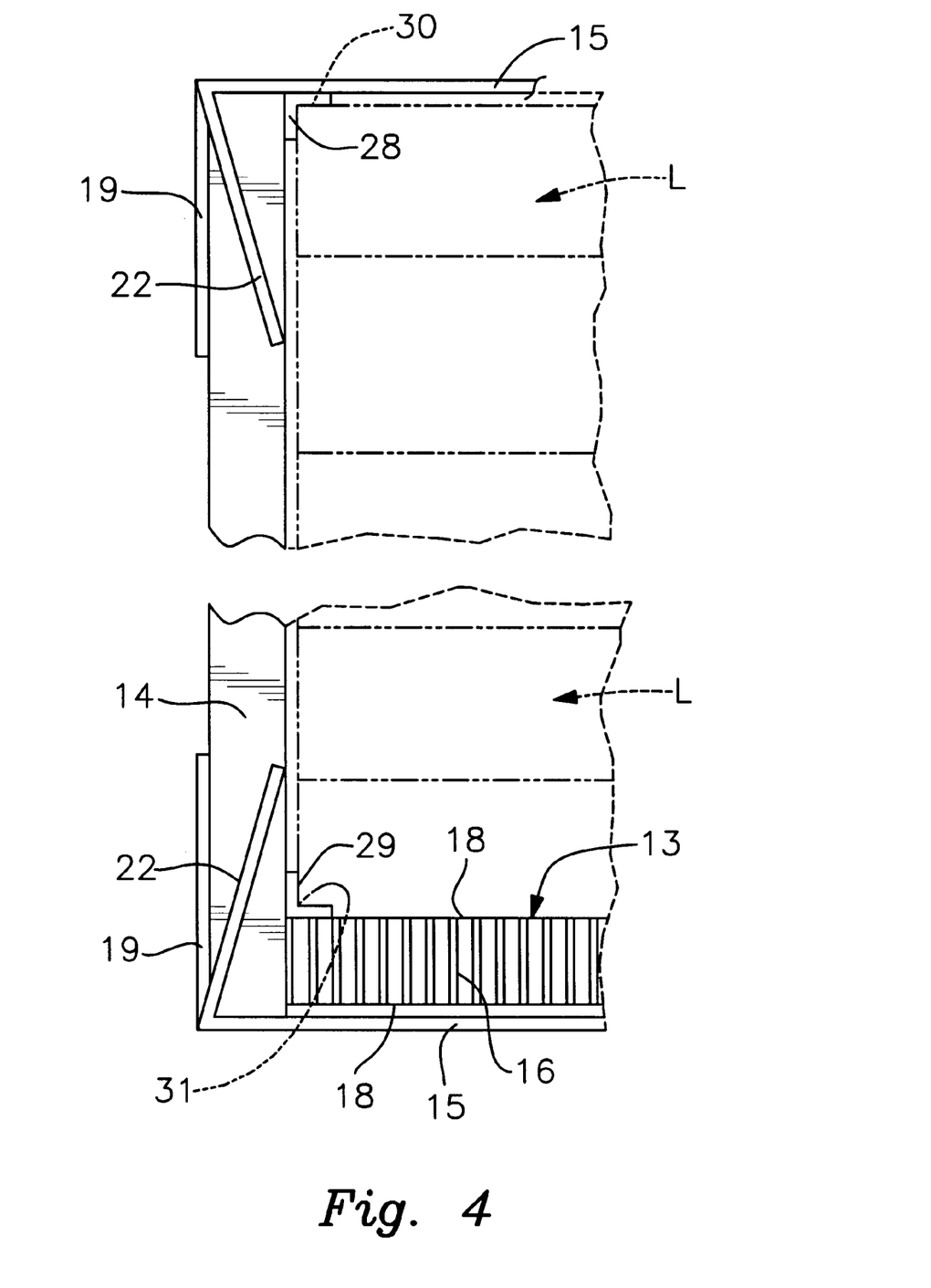
FIG. 4 is an enlarged partial cross-sectional view on lines 4—4 of FIG. 1 with portions broken away for clarity.
Figure 5:
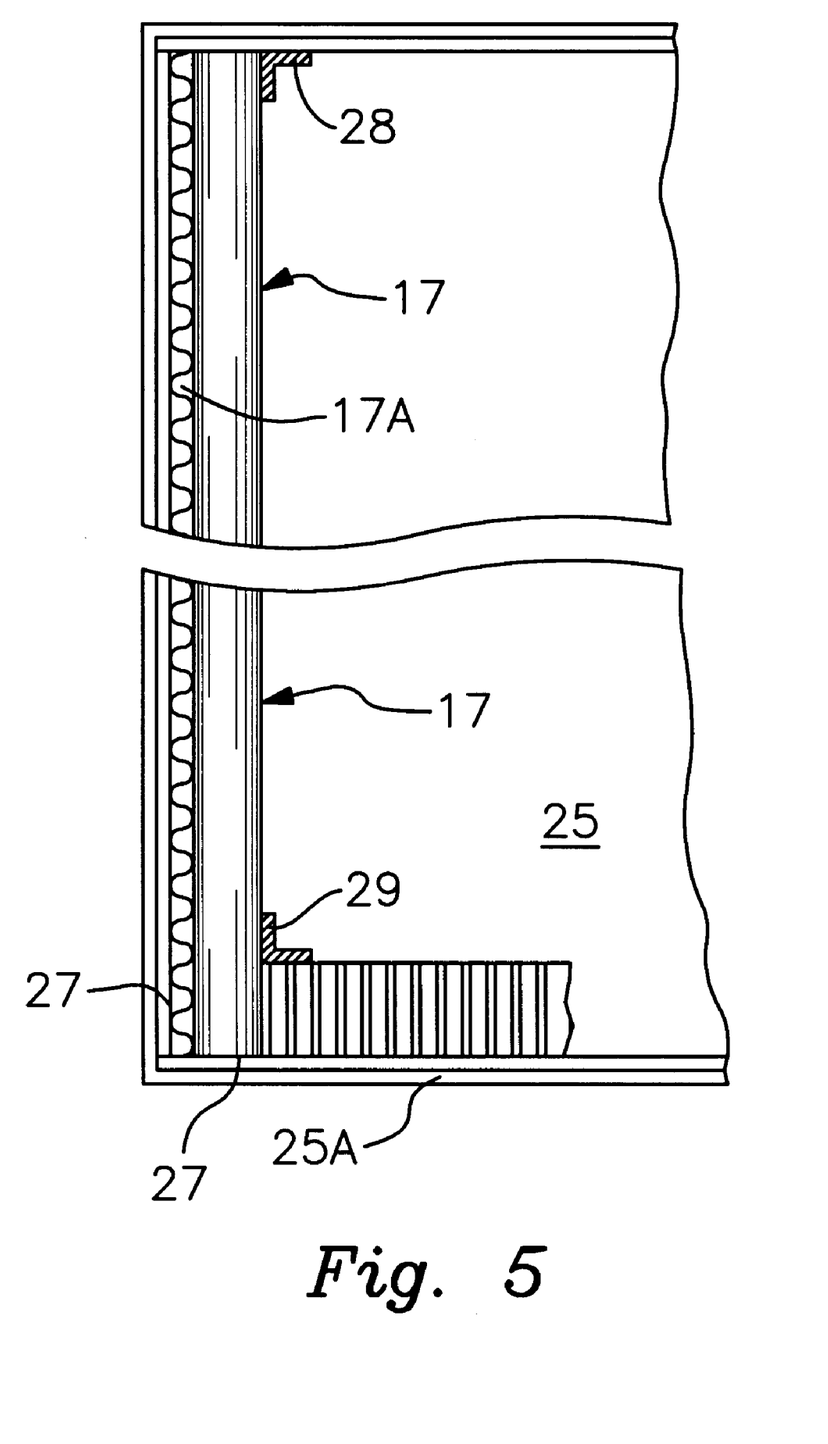
FIG. 5 is an enlarged partial cross-sectional view on lines 5—5 of FIG. 6.
Figure 6:
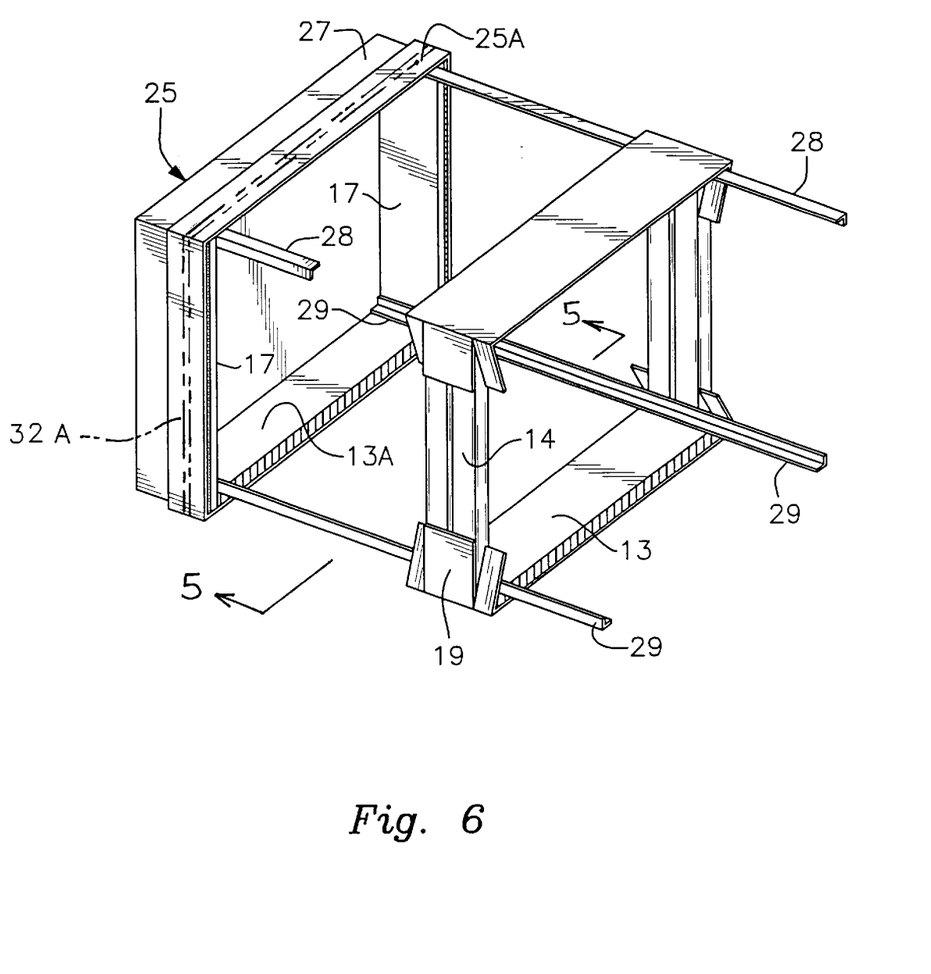
FIG. 6 is a partial perspective view of the shipping container assembly of the invention with portions broken away.

To complete the shipping container assembly 10 about the load L, pairs of elongated angle edge guards 28 and 29 extend along the entire length of the shipping assembly 10 in its respective interior corners which, in reality, would be on the outer perimeter upper and lower edges 30 and 31 of the load L shown in broken lines and as illustrated in FIG. 4 of the drawings.

Figure 7:
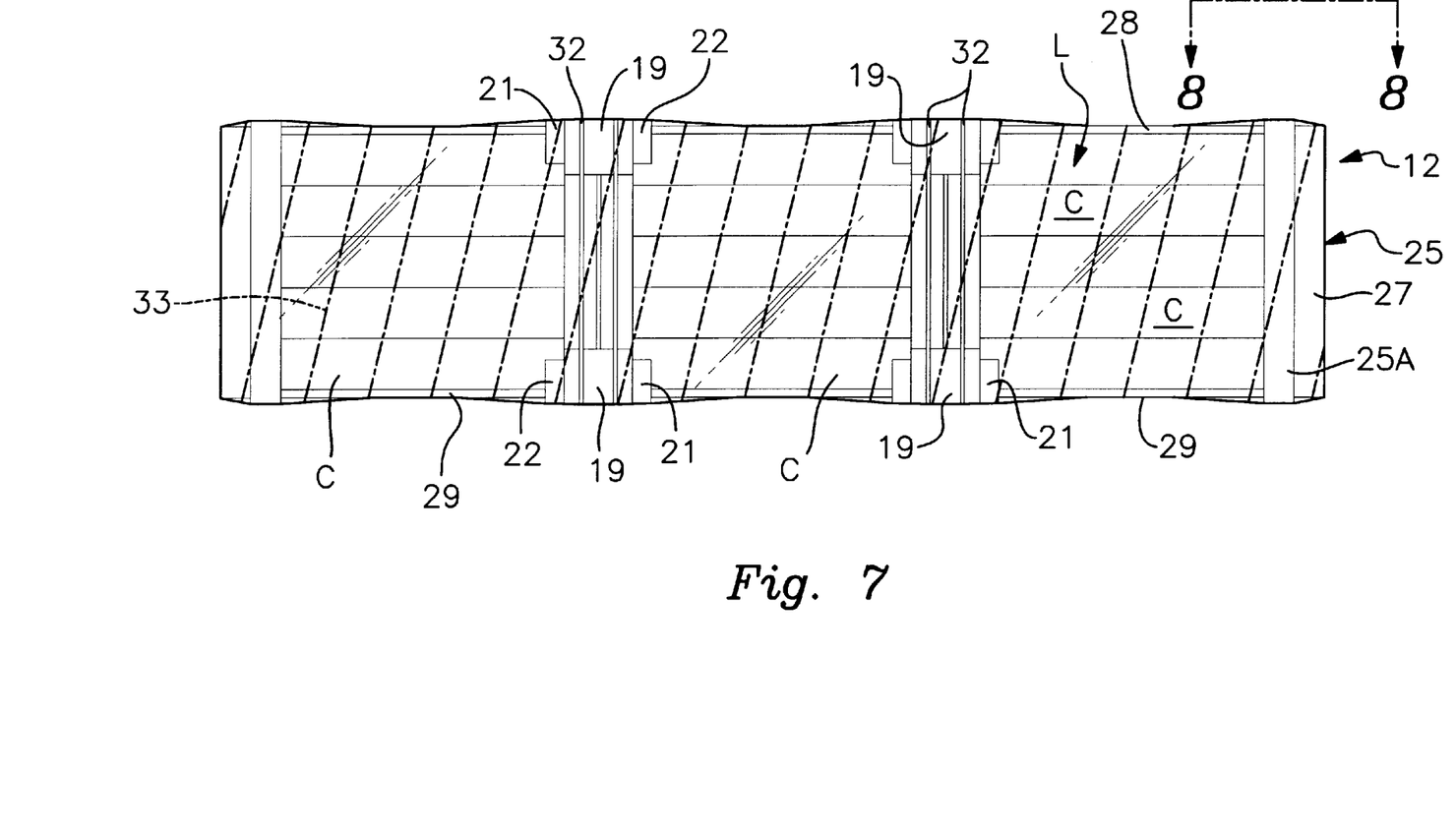
FIG. 7 is a top plan view of the shipping container system of the invention on a load.
Figure 8:
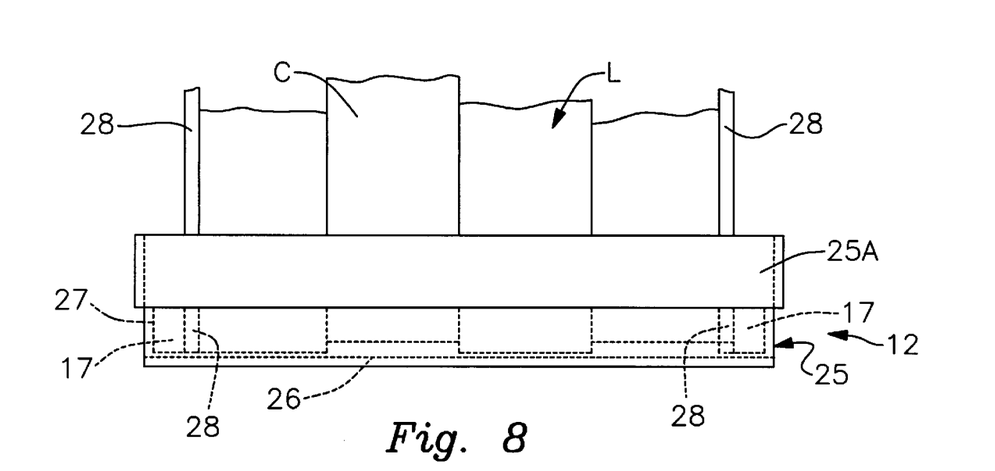
FIG. 8 is an enlarged partial top plan view of an end cap portion of the shipping container assembly positioned on a load.

The elongated angle edge guard pairs 28 and 29 are formed from cellulose material, specific cardboard, and are of a length greater than that of the load L so that the end cap assemblies will be uniform regardless of load length inconsistency. To secure the components of the shipping container assembly 10 on the load L, banding strips 32 preferably of synthetic resin material are employed around the internal support structures 11 as seen in FIG. 3 of the drawings. Alternately, auxiliary banding strips 32A can be secured about the end cap assemblies 12 as indicated by broken lines in FIG. 6 of the drawings as will be well understood by those skilled in the art. The entire shipping container assembly 10 of the invention is then transversely stretch wrapped in elastic synthetic resin film 33 as best seen in FIG. 7 of the drawings to form a contiguous monolithic bundle of material as will be well understood by those skilled in the art.

The viability of such cellulose construction components of the shipping container assembly of the invention will be self-evident in that they can easily be processed and recycled creating a viable resource for the end receiver. The shipping container assembly 10 defines a stabilization system for the load L formed of multiple elongated containers C which have little torsional rigidity and thus requires special securing structures to provide ease of loading and unloading and stability in shipping.

Alternately, it will be apparent to those skilled in the art that substitution can be made for certain elements of the shipping container assembly 10 of the invention such as to substitute wood, not shown, in place of the vertical support "sonoco" tubes 14 if so desired without changing the structural integrity of the overall shipping container assembly.

It will thus be seen that a new and useful shipping container assembly for non-rigid elongated loads has been illustrated and described and it will be apparent to those skilled in the art that various changes and modifications may be made therein without departing from the spirit of the invention.

Therefore, We claim:

1. A shipping container assembly for shipment of elongated containers of semi-rigid material, such as vinyl siding by securing a plurality of like dimensional containers into an integral bundle, said shipping assembly comprises: a plurality of longitudinally spaced parallel base pads, pairs of upstanding support tubes extending from some of said base pads, connecting elements interconnecting said upstanding support tube pairs in oppositely disposed spaced relation to one another, end cap assemblies on said remaining base pads each comprising: spacer support elements extending from said remaining base pads, a closure extending over said respective spacer elements and said remaining base pads, means for interconnecting said end cap assemblies and said base pads and tube assemblies on said like dimensional containers and means for securing said shipping container assembly about a said integral bundle.

2. The shipping container assembly set forth in claim 1 wherein said base pads are panels formed of cellulose construction having a honeycomb core between two containment outer sheet surfaces.

3. The shipping container assembly set forth in claim 1 wherein said support tubes are of multiple layered cellulose sheet construction.

4. The shipping container assembly set forth in claim 1 wherein said connecting elements interconnecting said support tube pairs to one another comprise: elongated cardboard sheets having oppositely disposed end flaps with positioning tabs formed therein.

5. The shipping container assembly set forth in claim 4 wherein said positioning tabs are engageable in oppositely disposed relation on said support tube pairs.

6. The shipping container assembly set forth in claim 1 wherein said spacer elements of said end cap assemblies comprise: multiple layered interconnected cardboard sheets.

7. The shipping container assembly set forth in claim 1 wherein said closure of said end cap assembly comprises a construction having a top, with pairs of oppositely disposed sidewalls extending integrally therefrom and a retaining sleeve about said sidewalls.

8. The shipping container assembly set forth in claim 1 wherein said means for interconnecting said end cap assemblies and said some of base pads and tube assemblies comprises; independent elongated angular edge guards for positioning between said shipping assembly and said containers.

9. The shipping container assembly set forth in claim 1 wherein said means for securing said shipping assemblies about said integral bundle comprises: banding about said respective connecting elements and said upstanding support tube pairs on some of said base pads, and a continuous band of stretch wrap film extending transversely around said shipping assembly on said integral bundle.

10. The shipping container assembly set forth in claim 1 wherein said elongated containers of semi-rigid material are positionable transversely across said base pads to form said integral bundle.

* * * * *